3,209,038
PROCESS FOR PRODUCING NITROPARAFFINS BY REACTING AN ALKYL NITRITE WITH A NITRATING AGENT
Leonard A. Stengel and Richard L. Abbott, Terre Haute, Ind., assignors to Commercial Solvents Corporation, a corporation of Maryland
No Drawing. Filed Jan. 23, 1964, Ser. No. 339,599
12 Claims. (Cl. 260—644)

The present invention relates to a novel process for the preparation of nitroparaffins. More particularly, this application pertains to the preparation of nitroparaffins by nitration of alkyl nitrites, e.g., n-propyl nitrite, iso-propyl nitrite, and the like, especially under such conditions as to selectively produce desired nitroparaffins of lower carbon chain length, e.g., nitromethane and nitroethane.

It has been known for many years that nitroparaffins can be produced by reacting paraffins with a nitrating agent such as nitric acid or an oxide of nitrogen in the vapor phase. In this known process, however, although the rate of nitration is fast, the rate of oxidation is also very fast, and in fact, to avoid the latter becoming excessive and a consequent risk of explosion, it is not practical to employ a volume ratio of paraffin to nitrating agent of less than about 3 to 1. Although considerable progress has been made in the synthesis of nitroparaffins during the past decade, this progress has resulted in an increase in the conversion of the paraffin under conditions that have not resulted in enhanced production of particular nitroparaffins. For example, a mixture of nitromethane, nitroethane, 1-nitropropane and 2-nitropropane is obtained from the nitration of propane with suitable nitrating agents. In addition, partial oxidation products such as aldehydes, ketones and acids are obtained under such conditions thereby presenting a separation problem and sacrifice in ultimate yield of nitroparaffin.

The present invention is directed, in contrast to these known processes, to a process for the preparation of nitroparaffins by nitration of the alkyl nitrites to provide greater selectivity in the production of desired nitroparaffins, for example, nitromethane and nitroethane from propyl nitrite. For instance, in the nitration of the alkyl nitrites, far fewer nitroalkanes are produced than if the corresponding alkane had been nitrated according to the prior art. Accordingly, separation of the nitroparaffin products is less difficult. Moreover, the alkyl nitrite can be selected to provide desired nitroparaffins.

The present process generally involves reaction of an alkyl nitrite and a nitrating agent at a relatively high temperature. Under the reaction conditions which characterize the present process, as are described in detail hereinafter, an appreciable reaction occurs to produce nitroparaffins selectively.

The nitrating agents used in the present process include nitric acids, generally 40 to 70 percent nitric acids (specific gravity about 1.25 to 1.42) and oxides of nitrogen higher than NO such as $NO_2$.

One of the most advantageous factors of the present invention is the mole ratio of the nitrite to the nitrating agent which can be low, e.g., approximately 1:1, as well as 30:1 or more, for instance, to produce nitroparaffins selectively. Generally a ratio of from about 0.5:1 to 2.5:1 is preferred, and a ratio of from about 0.7:1 to about 1.2:1 is optimum.

The reaction temperatures employed are those sufficient to effect reaction between the alkyl nitrite and the nitrating agent. In general, with nitric acid, a temperature of at least 250 or 350° C. and up to 450° C., or more, preferably 375° to 425° C., is used. If the nitrating agent to be used is $NO_2$ the temperature is generally from about 240° to 325° C. At temperatures much in excess of 325° C., i.e., about 361° C. the reactants may be oxidized, i.e., burned-up, when the $NO_2$ nitrating agent is used. The present process is generally carried out at about atmospheric pressure although an increased pressure, e.g., up to about 15 atmospheres or more, may be used if desired.

The reaction time is dependent upon the temperature used. At higher temperatures, a shorter time can be used, which is preferred since it is desired to avoid production of partial oxidation products such as ketones, etc. At any temperature there is an optimum contact time and any additional increase in the contact time tends to increase the amount of oxidation products relative to the amount of nitration products. Generally a contact time of from about 0.01 to 20 seconds may be used for the above temperatures.

The alkyl nitrites which may be nitrated in the process of the present invention include those nitrites the alkyl group of which has from two up to about eight to ten carbon atoms. Specific examples of such alkyl nitrites include ethyl nitrite, n-propyl nitrite, isopropyl nitrite, n-butyl nitrite, n-amyl nitrite, n-hexyl nitrite, etc. In contrast to the nitration of a paraffin as known heretofore which requires the presence of a hydroxyl radical to initiate the same by removing a hydrogen, the present reaction is believed to be a thermal splitting of the alkyl nitrite at the carbon atoms having the nitrite radical attached, thus not requiring the presence of a hydroxyl radical, to form the specific nitroparaffins of a lower carbon atom range than the alkyl nitrite in addition to an aldehyde. n-Propyl nitrite, for example, when nitrated according to the present process, splits to form nitromethane, nitroethane and formaldehyde whereas isopropyl nitrite splits to form nitromethane and acetaldehyde.

The alkyl nitrites used in the present invention are easily obtained commercially and provide an inexpensive starting material for the production of the nitroparaffins. The nitrites may be produced, for example, by the nitrosation of lower alkyl alcohols with nitrous acid in the presence of water.

In carrying out the novel process of the present invention it is preferable to introduce the alkyl nitrite and nitrating agent as a mixture into a reactor with the mixture being preheated to a temperature below that at which the alkyl nitrite and nitrating agent will react. Accordingly, the nitrating agent, when nitric acid, may be pre-heated to a temperature of from about 200° to 260° C. and mixed with the alkyl nitrite in such proportions as to provide a molar ratio such as those described above, for instance, prior to introduction into the reactor. Of course, the nitrating agent and alkyl nitrite to be nitrated may be introduced into the reactor through separate streams.

The reactor can be heated by a molten salt to maintain an even temperature in the reactor by absorbing the heat of reaction in order to insure a good yield of the desired nitroparaffins. The choice of salt to be employed as the molten medium depends upon the choice of the temperature at which the reaction is to be carried out. It is generally preferred to employ a eutectic mixture of potassium and sodium nitrates. Since such mixture can be maintained in the molten state throughout a temperature range of about 260° to 550° C. without solidification or decomposition. Other single salts or mixture of salts can obviously be employed, as, for example, a eutectic mixture of sodium, potassium, and lithium nitrates which has a melting point below 200° C., i.e. about 175° C.

Since the reaction between the nitrite and the nitrating agent is exothermic, it is also possible to spray one or both of the reactants as a liquid into a reaction zone and utilize the heat of reaction to vaporize the liquid reactant or reactants. A reactor of this type may operate substantially adiabatically.

Since the reaction product of the nitrating agent and alkyl nitrite is in the gaseous phase it can easily be removed from the reaction zone by means of a vapor exit and thereafter condensed. The condensed products form an aqueous layer and an oily nitroparaffin layer which may be easily separated from the aqueous layer by convention methods.

The following examples are provided hereinafter in order to further illustrate the present invention without, however, limiting the same.

EXAMPLE I n-Propyl nitrite at ambient temperature was allowed to enter a stream of 50% nitric acid vapor preheated to 260° C. at a rate such that the molar ratio of nitrite to nitric acid was maintained at 0.87. The gaseous mixture was fed to a reactor which consisted of a coiled aluminum tube immersed in a molten mixture of potassium and sodium nitrates heated to 400° C. The pressure in the reactor was essentially atmospheric and the contact time was two seconds. The reaction products were condensed and the nitroparaffin layer was separated from the aqueous layer. The nitroparaffin product was 83% nitroethane and 17% nitromethane.

EXAMPLES II THROUGH XIII

In an apparatus similar in all essentials to that described in Example I, nitric acid was reacted with isopropyl nitrite and n-propyl nitrite in the molar ratio and under the conditions set forth hereinbelow in Table I.

EXAMPLES XVIII THROUGH XXII

In an apparatus similar in all essential respects to that described in Example I, the following alkyl nitrites were nitrated with nitric acid and nitrogen dioxide according to the following table.

| | Alkyl nitrite | Nitrating agent | Nitroparaffin produced |
|---|---|---|---|
| XVII | Ethyl nitrite | $HNO_3$ | Nitromethane (NM). |
| XVIII | n-Butyl nitrite | $HNO_3$ | Nitromethane, nitroethane, and nitropropane. |
| XIX | n-Amyl nitrite | $HNO_3$ | Nitromethane, nitroethane, 1-nitropropane, 1-n-butane. |
| XX | n-Hexyl nitrite | $NO_2$ | Nitromethane, nitroethane, 1-nitropropane, 1-n-butane, 1-n-pentane. |
| XXI | t-Butyl nitrite | $HNO_3$ | Nitromethane. |
| XXII | Iso-amyl nitrite | $HNO_3$ | 1-nitro-2-methylpropane, 2-nitropropane, nitromethane. |

These examples illustrate the greater selectivity provided by the process of the present invention. For instance, when isopentane is nitrated according to the prior art processes, in addition to the products set forth in Example XXII, the production of 1-nitro-2-methylbutane; 2-nitro-3-methylbutane; 2-nitro-2-methylbutane; 1-nitro-3-methylbutane; nitroethane; and 2-nitrobutane would be formed.

Various equivalents of the process in accordance with the invention are obvious, of course, to those skilled in the art and such equivalents are to be included within the scope of the present invention.

*Table I*

| Example | Nitrite | Nitrite feed (g.) | $HNO_3$ feed (g.) | Mol ratio nitrite to $HNO_3$ | T., °C. Preheat | T., °C. React. | Oil recov. (g.) | Nitrite recov. (g.) | Nitromethane (g.) | Nitroethane (g.) | 2-nitropropane | Percent conv. on $HNO_3$ | Percent yield on nitrite |
|---|---|---|---|---|---|---|---|---|---|---|---|---|---|
| II | Isopropyl | 25.3 | 20 | .90 | 240 | 268 | 9 | 6.85 | .027 | | .35 | 1.37 | 2.2 |
| III | do | 24.4 | 21 | .82 | 254 | 325 | 3.5 | 3.1 | .123 | | .14 | 1.08 | 1.50 |
| IV | do | 46.4 | 40.5 | .81 | 255 | 372 | 3.0 | .55 | 1.54 | | .26 | 4.35 | 5.3 |
| V | do | 67.5 | 56.0 | .85 | 254 | 421 | 7.5 | 1.16 | 4.31 | | .30 | 8.36 | 10.0 |
| VI | n-Propyl | 37.4 | 30.0 | .88 | 244 | 353 | 8.5 | 4.79 | .35 | 2.65 | | 8.65 | 11.2 |
| VII | do | 33.6 | 32.0 | .74 | 255 | 379 | 5.5 | 1.61 | .47 | 3.03 | | 9.5 | 13.3 |
| VIII | do | 44.8 | 36.5 | .87 | 258 | 400 | 13.3 | 2.81 | 1.52 | 7.03 | | 22.1 | 26.9 |
| IX | do | 45.7 | 32.0 | 1.01 | 253 | 428 | 9.0 | 1.11 | 1.21 | 5.84 | | 19.1 | 19.3 |
| X | do | 54.2 | 37.0 | 1.04 | 262 | 396 | 10.0 | .97 | .65 | 4.18 | | 11.3 | 11.1 |
| XI | do | 63.5 | 40 | 1.12 | 258 | 415 | 13.0 | .65 | .21 | 4.88 | | 10.8 | 9.7 |
| XII | do | 53.3 | 40 | .95 | 251 | 414 | 6.0 | .28 | .25 | 1.90 | | 4.6 | 4.9 |
| XIII | do | | | .4 | | 400 | *none | | | | | | |

*All oxidized.

EXAMPLE XIV

In an apparatus, similar in all essentials to that described in Example I, nitrogen dioxide preheated to 227° C. was mixed with liquid isopropyl nitrite and passed through the reactor at a temperature of 258° C. The mole ratio was 0.95. After the reaction products were condensed the nitroparaffin in the organic layer was found to be substantially nitromethane.

EXAMPLES XV THROUGH XVII

In an apparatus similar in all essentials to that described in Example I, nitrogen dioxide was reacted with isopropyl nitrite and n-propyl nitrite in the molar ratio and under the conditions set forth hereinbelow in Table II. Example XIV is included in Table II for comparison.

It is claimed:

1. A process for the selective production of nitroparaffins comprising reacting an alkyl nitrite with a nitrating agent at a temperature of at least about 240° C. to produce nitroparaffin and recovering the nitroparaffins.

2. The process of claim 1 wherein the nitrite and nitrating agent are reacted in a molar ratio of the nitrite to the nitrating agent of from about 0.5:1 to 2.5:1.

3. The process of claim 1 wherein the nitrite is propyl nitrite.

4. The process of claim 3 wherein the nitrating agent is nitric acid.

5. The process of claim 3 wherein the nitrating agent is $NO_2$.

6. A process for the selective production of nitro-

*Table II*

| Run | Nitrite | Nitrite fed, g. | $NO_2$ fed, g. | Mol ratio nitrite $NO_2$ | T Pre | T React | Oil rec., g. | NM, g. | NE, g. | nP nitrate, g. | Iso P nitrate | Percent conv. on $NO_2$ NPs | Percent conv. on $NO_2$ Nitrate | Percent yield on nitrite NPs | Percent yield on nitrite Nitrate |
|---|---|---|---|---|---|---|---|---|---|---|---|---|---|---|---|
| XV | Isopropyl | 20.3 | 11.0 | .95 | 222 | 225 | 14.5 | .015 | | | .725 | 0.1 | 2.9 | .28 | 8.1 |
| XVI | do | 18.6 | 11.0 | .87 | 225 | 242 | 12.8 | .026 | | | 1.95 | 0.17 | 7.8 | .25 | 20.9 |
| XIV | do | 20.3 | 11.0 | .95 | 227 | 258 | 11.6 | .22 | | | 2.00 | 1.46 | 8.0 | 2.5 | 13.6 |
| XVII | n-Propyl | 23.4 | 11.0 | 1.10 | 220 | 253 | 16.0 | .032 | .512 | 2.27 | | 3.05 | 9.5 | 5.2 | 15.4 | paraffins comprising reacting an alkyl nitrite with nitric acid at a temperature from about 260° to 450° C. to produce nitroparaffin, and recovering the nitroparaffins.

7. The process of claim 6 wherein the temperature is from about 375° to 425° C.

8. The process of claim 6 wherein the nitrite and nitric acid are reacted in a molar ratio of the nitrite to nitric acid from about 0.5:1 to 2.5:1, and at a pressure from about atmospheric pressure up to about 15 atmospheres.

9. The process of claim 8 wherein the reactants are reacted at a contact time from about 0.2 to 20 seconds.

10. A process for the selective production of nitroparaffins comprising reacting an alkyl nitrite with $NO_2$ at a temperature from about 240° to 325° C. to produce nitroparaffin and recovering the nitroparaffin.

11. A process for the selective production of nitromethane which comprises reacting an alkyl nitrite having from about 2 to 10 carbon atoms with a nitrating agent at an elevated temperature from about 240° to 450° C. in a molar ratio of nitrite to nitrating agent of from about 0.5 to 2.5:1, recovering gaseous products including nitromethane from the reaction zone, and separating the nitromethane from the gaseous products.

12. A process as defined in claim 11 wherein the nitrite is n-propyl nitrite and nitroethane is also recovered from the gaseous products.

No references cited.

CARL D. QUARFORTH, *Primary Examiner.*